United States Patent [19]

Dyer et al.

[11] Patent Number: 5,746,447
[45] Date of Patent: May 5, 1998

[54] AIRBAG MODULE

[75] Inventors: David J. Dyer, Kaysville, Utah; Claus J. Geisler, Markgröningen; Ulrich Woerner, Weil derStadt, both of Germany

[73] Assignee: Morton International, Inc., Chicago, Ill.

[21] Appl. No.: 784,567

[22] Filed: Jan. 21, 1997

[51] Int. Cl.⁶ ................................................. B60R 21/16
[52] U.S. Cl. ......................... 280/743.2; 280/743.1; 280/730.1
[58] Field of Search ............................ 280/743.1, 743.2, 280/728.2, 732, 729, 730.1

[56] References Cited

U.S. PATENT DOCUMENTS

| | | | |
|---|---|---|---|
| 5,282,646 | 2/1994 | Melvin et al. | 280/729 |
| 5,306,043 | 4/1994 | Mihm et al. | 280/732 |
| 5,332,256 | 7/1994 | Lauritzen et al. | 280/728 A |
| 5,344,182 | 9/1994 | Lauritzen et al. | 280/728 A |
| 5,407,226 | 4/1995 | Lauritzen et al. | 280/728 R |
| 5,470,105 | 11/1995 | Rose et al. | 280/740 |
| 5,489,119 | 2/1996 | Prescaro et al. | 280/743.2 |
| 5,501,489 | 3/1996 | Folsom et al. | 280/743.1 |
| 5,513,877 | 5/1996 | MacBrien et al. | 280/743.2 |
| 5,520,413 | 5/1996 | Mossi et al. | 280/729 |
| 5,538,281 | 7/1996 | Patercsak | 280/743.1 |
| 5,570,905 | 11/1996 | Dyer | 280/743.2 |
| 5,613,698 | 3/1997 | Patercsak et al. | 280/743.1 X |
| 5,636,861 | 6/1997 | Orsulak et al. | 280/730.1 |

Primary Examiner—Christopher P. Ellis
Attorney, Agent, or Firm—Nick C. Kottis; Gerald K. White

[57] ABSTRACT

An inflatable restraint airbag module for the protection of an occupant of a vehicle is provided wherein portions of a tethered airbag cushion are separately folded and stored within a module housing to provide a deployment process that can serve to minimize or avoid problems such as bag slap and improper positioning of the airbag cushion upon deployment.

16 Claims, 8 Drawing Sheets

AIRBAG MODULE

BACKGROUND OF THE INVENTION

This invention relates generally to inflatable restraint systems and, more particularly, to airbag modules.

Airbag module assemblies generally include, as basic components: 1) a cushion or airbag that is inflated with gas such as when the vehicle encounters a sudden deceleration, 2) an inflator which upon actuation serves to provide the gas used to inflate the airbag, and 3) a reaction canister which typically functions as a structural housing supporting assembly components such as the inflator and the airbag, for example, while providing a mounting base for installation of the assembly in a vehicle and direction to the inflation gases resulting from the inflator.

In such module assemblies, the airbag is typically stored within the reaction canister in an uninflated, folded condition. In practice, reaction canisters containing an airbag for the protection of a front seat passenger commonly have a rectangular cross sectional shape and form a correspondingly shaped opening wherethrough the airbag is deployable. Normally, a passenger side airbag module assembly is mounted in or behind what is called the vehicle instrument panel or dashboard (hereinafter referred to as the "instrument panel"), with the airbag deployment opening of the reaction canister positioned planar or adjacent with the instrument panel.

Airbag module assemblies and particularly passenger side airbag modules, which contain airbag cushions which are usually of a much larger volume than driver side airbag cushions, present a number of special problems that are addressed in different ways by various manufactures. One typically common aim in airbag module design is the avoidance or prevention of an airbag cushion from hitting or slapping an occupant, particularly in the head region, as the airbag cushion deploys during a crash incident. In the art, such undesired contact between a deploying airbag cushion and an occupant is commonly referred to as "bag slap." Bag slap can occur when a deploying airbag cushion is of a length that extends longer than the distance between the occupant and the instrument panel in which the airbag module is housed. When an occupant is situated especially close to the restraint system, there is an increased potential risk for injury to the occupant as a result of such undesired contact with the deploying airbag cushion.

In addition to the possibility of bag slap, an airbag cushion having a length which extends longer than the distance between the occupant and the instrument panel in which the airbag module is housed can be subject to a number of other potential problems or disadvantages. For example, such an airbag cushion and inflatable restraint installation can create problems regarding the proper positioning of the airbag cushion upon deployment.

In the past, techniques such as the utilization of special airbag cushion folding techniques and the inclusion of one or more tethers within the airbag cushion have, to a certain extent, been successful in overcoming or avoiding at least certain of these problems. For example, undesired bag slap can be avoided through the packaging of an airbag cushion using a roll fold wherein the uninflated airbag cushion is simply rolled into a compact shape. Also, the inclusion of one or more tethers such as within an airbag cushion can be used to influence the deployment direction of the airbag cushion.

Unfortunately, while the use of these techniques may successfully avoid or overcome certain of these problems in particular restraint system installations, such use may create or exacerbate other problems. For example, while roll fold packaging of an airbag cushion can avoid undesired bag slap, such a packaged airbag cushion may require an excessively long time period in which to deploy, making the use of such a folding technique impractical and undesired. Also, substantially greater airbag cushion pressures are normally associated with the use of a roll folded airbag cushion. It will be appreciated that excessive airbag cushion pressures can undesirably result in failure of an airbag cushion.

Thus, there is a need and a demand for an airbag module which avoids the problems of undesired contact by the deploying airbag cushion with the occupant, particularly undesired contact by the deploying airbag cushion with the head region of the occupant.

Further, there is a need and a demand for an airbag module which avoids such undesired contact by the deploying airbag cushion while also avoiding unduly lengthening the time period required for the airbag cushion to properly deploy to provide the desired protection to the occupant.

Still further, there is a need and a demand for an airbag module which provides improved airbag cushion positioning upon deployment of the airbag cushion from the module.

Yet still further, there is a need and a demand for an improved airbag module, particularly for the passenger side of a vehicle.

SUMMARY OF THE INVENTION

A general object of the invention is to provide an improved airbag module.

A more specific objective of the invention is to overcome one or more of the problems described above.

The general object of the invention can be attained, at least in part, through an inflatable restraint airbag module for the protection of a vehicle occupant. The module includes an inflatable airbag cushion, an airbag inflator, a reaction canister and an inflation gas diffuser. The inflatable airbag cushion has external and internal surfaces, an inflation gas inlet opening and a rearwardly facing cushioning surface for engaging the occupant when the airbag cushion is inflated. The airbag cushion includes a tether having opposed first and second ends. The first end of the tether is attached to the internal surface of the rearwardly facing cushioning surface and the second end of the tether is attached to an airbag cushion tether base. The tether divides the airbag cushion into an upper portion and a lower portion. Upon actuation, the airbag inflator emits inflation gas. The reaction canister is open-mouthed, forming a housing for the airbag cushion and the inflator. The inflation gas diffuser includes a face member interposed between the inflator and the gas inlet opening of the airbag cushion. The face member includes a gas flow through area which includes at least one inflation gas passage aperture for conveying inflation gas from the inflator to the airbag cushion. The diffuser and the reaction canister cooperate to define an inflator storage volume for storage of the inflator and an airbag cushion storage volume for storage of the airbag cushion. The airbag cushion storage volume includes an airbag cushion storage compartment offset from the gas flow through area of the diffuser and an airbag cushion storage space directly adjacent the gas flow through area of the diffuser.

In the module, the lower portion of the airbag cushion is formed in a compact shape and placed within the airbag cushion storage compartment and the upper portion of the airbag cushion is formed in a compact shape and placed within the airbag cushion storage space. Upon inflation of the airbag cushion, inflation of the upper portion of the airbag cushion precedes inflation of the lower portion of the airbag cushion.

The prior art fails to provide an as efficient as desired airbag module design in avoiding problems such as improper positioning of the airbag cushion on deployment and undesired contact by the deploying airbag cushion with the occupant, particularly undesired contact by the deploying airbag cushion with the head region of the occupant, while also avoiding unduly lengthening the time period required for the airbag cushion to properly deploy to provide the desired protection to the occupant.

In another embodiment, the invention further comprehends a passenger side inflatable restraint airbag module for the protection of a vehicle occupant which includes a stored inflatable airbag cushion, an airbag inflator, an open-mouthed reaction canister forming a housing for the airbag cushion and the inflator, and an inflation gas diffuser. The airbag cushion has external and internal surfaces and is formed of a sheet material. The airbag cushion includes, at a forward end, a throat section defining an inflation gas inlet opening and a main panel forming a rearwardly facing cushioning surface for engaging the occupant when the airbag cushion is inflated. The airbag cushion further includes a tether having opposed first and second ends. The first end of the tether is attached to the internal surface of the rearwardly facing cushioning surface and the second end of the tether is anchored to the airbag module. The tether divides the main panel of the airbag cushion into an upper third portion adapted for engaging the occupant's head and a lower two-thirds portion adapted for engaging the occupant below the head. The inflation gas diffuser includes a face member interposed between the inflator and the gas inlet opening of the airbag cushion. The face member includes a gas flow through area formed of at least one inflation gas passage aperture for conveying inflation gas from the inflator to the airbag cushion. The diffuser and the reaction canister cooperate to define an inflator storage volume for storage of the inflator and an airbag cushion storage volume for storage of the airbag cushion. The airbag cushion storage volume includes an airbag cushion storage compartment offset from gas flow through area of the diffuser and an airbag cushion storage space directly adjacent the gas flow through area of the diffuser. The lower two-thirds portion of the main panel of the airbag cushion is accordion folded in a compact shape and placed within the airbag cushion storage compartment and the upper third portion of the main panel of the airbag cushion is folded in a compact shape over the gas flow through area of the diffuser and placed within the airbag cushion storage space.

In this module, inflation of the airbag cushion includes the following sequential steps:

a) inflation and deployment of the upper third portion of the airbag cushion through the mouth of the reaction canister;

b) the tether becoming fully extended to limit rearward extension of the rearwardly facing cushioning surface of the airbag cushion when the airbag cushion is inflated; and c) passage of additional inflation gas into the lower two-thirds portion of the main panel of the airbag cushion to provide protection to the lower portion of the body of the occupant.

The invention still further comprehends an inflatable folded airbag cushion for restraining a vehicle occupant. The airbag cushion is made of an airbag material and has an initially unfolded and uninflated condition. The airbag cushion further has a forward end and a rearwardly facing cushioning surface for engaging the occupant when the airbag cushion is inflated. The airbag cushion defines a gas inlet opening at a central position at the forward end. The gas inlet opening is attached to a cushion housing assembly having an open side and a diffuser having a gas flow through area including at least one inflation gas passage aperture for conveying inflation gas to inflate the airbag cushion. The airbag cushion has an upper portion above the gas inlet opening and a lower portion below the gas inlet opening. The airbag cushion is pleated to have a width corresponding to the length of the cushion housing assembly. The lower portion of the airbag cushion is in a folded compact shape within the cushion housing in an airbag cushion storage compartment offset from the gas flow through area of the diffuser. The upper portion of the airbag cushion is in a folded compact shape within the cushion housing in an airbag cushion storage space directly adjacent the gas flow through area of the diffuser. Upon inflation of the airbag cushion, inflation of the upper portion of the airbag cushion precedes inflation of the lower portion of the airbag cushion.

As used herein, references to "extrusion" and "conventional extrusion" are to be understood to delineate from impact processing. Specifically, extrusion generally refers to a fundamental processing operation in many industries in which a material is forced through a metal forming die, followed by cooling or chemical hardening. In contrast, in impact processing, a part is formed in a confining die from a metal slug, usually cold, by a single stroke application of force through a punch causing the metal to flow around the punch. While impacts are suited for the making of hollow parts that have one end totally closed, an extrusion rather than an impact is better suited for the formation of a tubular outside wall with open ends, such as described later herein.

Other objects and advantages will be apparent to those skilled in the art from the following detailed description taken in conjunction with the appended claims and drawings.

DETAILED DESCRIPTION OF THE INVENTION

The present invention, as is described in more detail below, provides an improved inflatable folded airbag cushion and inflatable restraint airbag module for protecting an occupant of a vehicle in the event of sudden vehicle deceleration, such as occurs during a collision.

Figure 1:
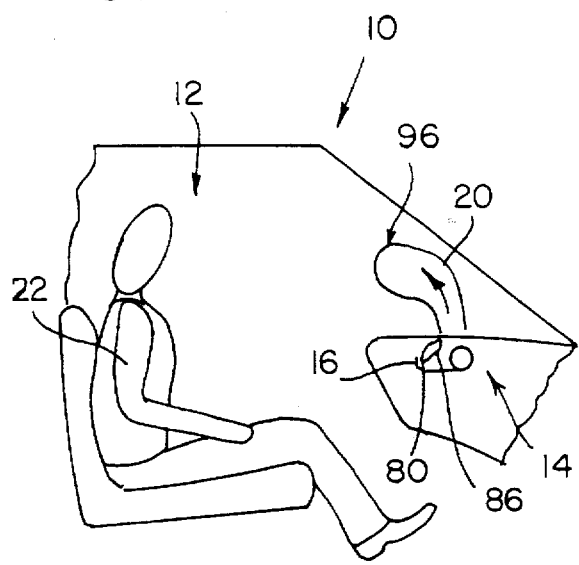
FIGS. 1–4 are a series of schematic, partially broken away, views illustrating the process of deployment of an airbag cushion from an airbag module assembly, in accordance with one embodiment of the invention, within the interior of a vehicle.

FIG. 1 illustrates a vehicle 10 having an interior 12 wherein is positioned a passenger side airbag module assembly 14, in accordance with one embodiment of the invention. The airbag module assembly 14 includes an open-mouthed reaction canister 16 which forms a housing for an airbag cushion 20 for the protection of a vehicle occupant 22 by restraining movement of the occupant in a direction toward the front of the vehicle, i.e., in the direction toward the right as viewed in FIG. 1. It will be appreciated that certain standard elements, not necessary for an understanding of the invention, such as the reaction canister end plates, have been omitted or removed for purposes of facilitating illustration and comprehension.

Figure 5:
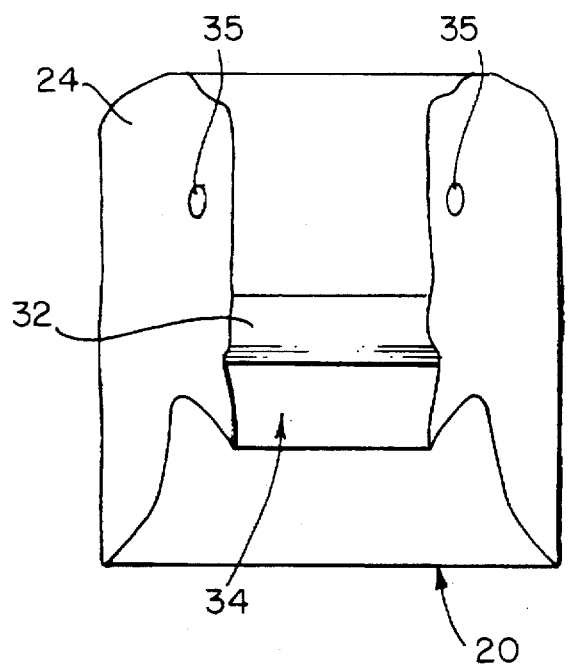
FIGS. 5 and 6, respectively, are end and side views of the inflated airbag cushion of FIG. 1.
Figure 6:
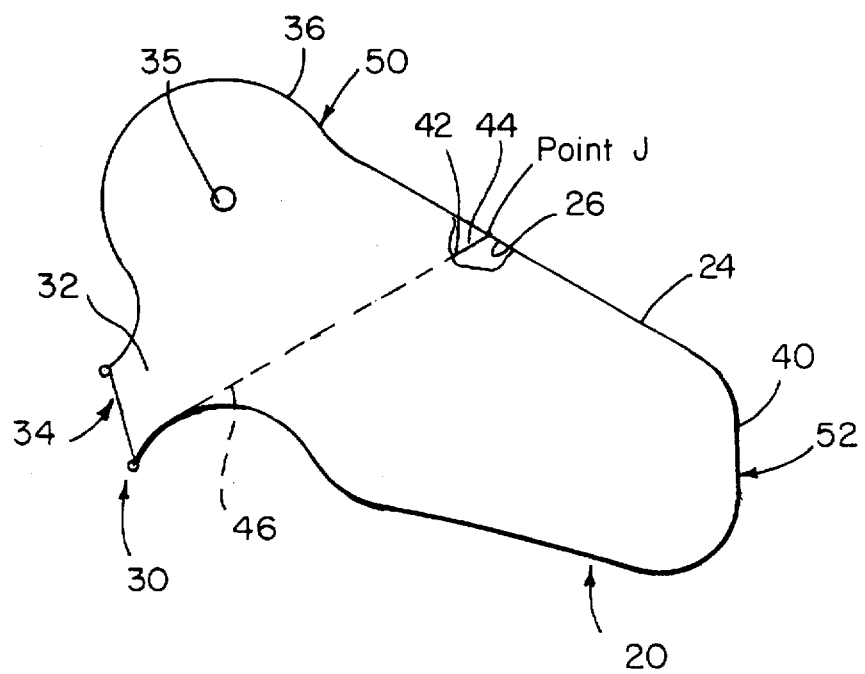

Turning to FIGS. 5 and 6, the airbag cushion 20 is shown in a fully inflated state. The airbag cushion 20 can be formed of various airbag materials such as a woven material or fabric, such as of nylon, for example. Typically, the airbag cushion 20 is formed of a sheet material. The airbag cushion 20 has an external surface 24, an internal surface 26 (as shown in FIG. 6), and has, at a forward end 30, a throat section 32 defining an inflation gas inlet opening 34 wherethrough inflation gas can be passed to permit the airbag cushion 20 to inflate.

Figure 4:
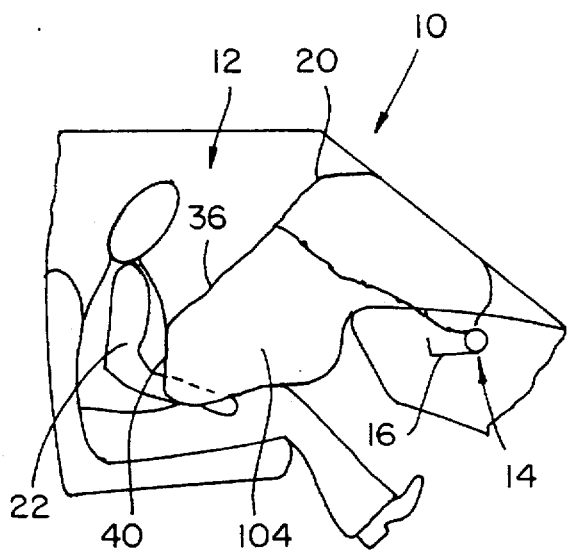

The airbag cushion 20 also includes a main panel 36 which forms a rearwardly facing cushioning surface 40 for engaging the occupant 22 when the airbag cushion has been inflated, as shown in FIG. 4.

Returning to FIGS. 5 and 6, the airbag cushion 20 includes an internal tether 42. The tether 42 has opposed first and second ends, 44 and 46, respectively. The first end 44 of the tether 42 is attached to the internal surface 26 of the rearwardly facing cushioning surface 40, at a point generally designated "Point J." The second end 46 of the tether 42 is anchored within the corresponding airbag module assembly to an appropriate tether base. For example, such second tether end 46 can be secured to an appropriate section of the airbag cushion 20 such as at the throat section 32, as shown in FIG. 6 or, alternatively, to an appropriate section of the corresponding reaction canister, for example. The tether 42 divides the main panel 36 into an upper third portion 50 adapted for engaging the head region of the occupant 22 (such as shown in FIG. 4) and a lower two-thirds portion 52 adapted for engaging regions of the occupant 22 below the head (such as also shown in FIG. 4).

As shown, the airbag cushion 20 may, as deemed desired or appropriate, include one or more vent holes 35 to permit the venting of an inflation media from an inflated airbag cushion such as in a manner known in the art.

Figure 7:
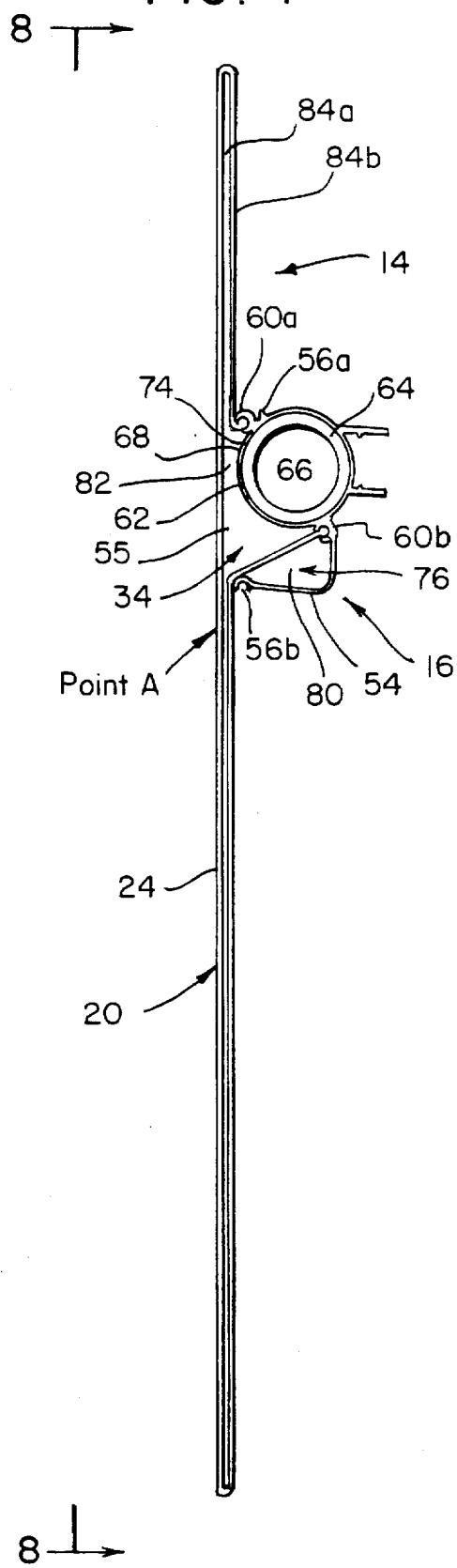
FIG. 7 is a simplified, partially in section, side view of the airbag module assembly of FIG. 1, with the airbag cushion in an uninflated substantially flat state.
Figure 8:
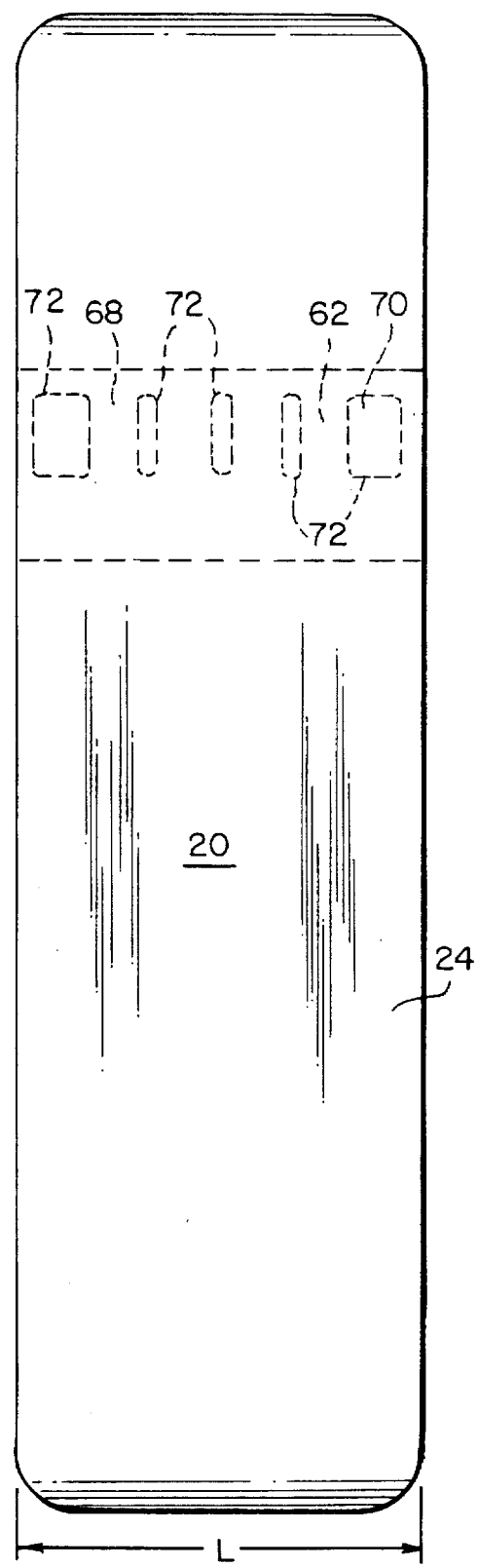
FIG. 8 is a front view, taken substantially along the line 8—8, of the airbag module assembly of FIG. 7.

Turning to FIGS. 7 and 8, the airbag module assembly 14 is shown with the airbag cushion 20 in an uninflated substantially flat state. The reaction canister 16 includes a reaction canister body 54, such as formed as a one piece construction by means of conventional extrusion of a light weight material such as a relatively light weight metal such as aluminum or magnesium, for example. The reaction canister body 54 has the general form of a long, narrow, open receptacle or trough and includes first and second opposite protective cover attachment channels, 56a and 56b, respectively, and first and second airbag cushion attachment channels, 60a and 60b, respectively. Again, it is to be appreciated that the reaction canister 16 in addition to the reaction canister body part 54 also includes, as is typical of such reaction canister structures, opposed end plates (not shown) at the opposed ends of the reaction canister body part 54. As is understood, such end plates typically serve to enclose the ends of the reaction canister.

The reaction canister body part 54 includes an integral continuous circumference inflation gas diffuser 62. Such a continuous circumference diffuser is specifically described in commonly assigned and herein fully incorporated U.S. Pat. No. 5,332,256, issued Jul. 26, 1994.

The diffuser 62 and the reaction canister 16 cooperate to define an inflator storage volume 64 for the storage of an inflator 66 which, upon actuation, serves to provide inflation gas for inflation of the airbag cushion 20.

It is to be appreciated that, in accordance with the invention, the reaction canister body can be variously sized and shaped, as desired, and need not be shaped as a generally continuous circular cross sectional shape diffuser. For example, the reaction canister body could, if desired, be sized and shaped in the form of an inflator holder of partial, generally circular cross section extending less than 360° such as shown and described in commonly assigned and herein fully incorporated U.S. Pat. No. 5,407,226, issued Apr. 18, 1995.

By the nature of such a diffuser 62 being tubular and in surrounding relation with the inflator 66 disposed therein, the inflator 66 can, as desired, be either a thrust neutral inflator (wherein the inflator includes gas discharge openings positioned such that the gas is discharged in opposing directions whereby there are no resulting forces tending to cause physical movement of the inflator and hence, the inflator will expend the energy generated thereby, generally in place) or a directional inflator.

The diffuser 62 includes a face member 68 interposed between the inflator 66 and the airbag cushion gas inlet opening 34. The diffuser face member 68 includes a gas flow through area 70 comprising gas passage apertures 72 for conveying inflation gas from the inflator 66 to the airbag cushion 20. That is, the tubular diffuser 62 includes a generally cylindrical wall 74 having spaced gas passage apertures 72 provided therein and facing the adjoining airbag cushion 20. To simplify the drawings in order to facilitate illustration and comprehension of the invention, the diffuser gas flow through area 70 and the gas passage apertures have only been shown in FIG. 8.

The airbag cushion 20 is appropriately secured to and within the reaction canister assembly 16 such by means of the cushion attachment channels 60a and 60b. For example, as shown and described in commonly assigned U.S. Pat. No. 5,344,182, issued Sep. 6, 1995 and U.S. Pat. No. 5,470,105, issued Nov. 28, 1995, the disclosures of which patents are fully incorporated herein by reference, the airbag cushion may have a peripheral edge thickened in the form of a hemmed loop of airbag material at the gas inlet opening edge of the airbag cushion and into which loop, a selected bead material is placed to better ensure positive engagement of the airbag cushion into the reaction canister. As will be appreciated, such a thickened airbag cushion peripheral edge can be appropriately secured within the cushion attachment channels 60a and 60b.

The airbag module assembly 14 may, if desired, include a protective cover (not shown) to overly the airbag cushion 20 stored within the reaction canister 16. Such a protective cover can serve to close the open top of the reaction canister 16 and thereby help to protect the airbag cushion 20 from damage such as by accidental or other undesired contact such as by or with other elements of the inflatable restraint system as well as extraneous elements in the environment to which the airbag cushion can be exposed. Also, such a protective cover can desirably serve to keep debris out of the airbag module assembly 14.

While such a protective cover can be fabricated of various materials, in practice it is preferable that the protective cover be fabricated of a tough, wear and normally tear resistant material, such as a thermoplastic olefin (commonly referred to in the industry as "TPO").

As will be appreciated, such a protective cover can be appropriately secured to the reaction canister 16 such as by means of the cover attachment channels 56a and 56b, such as in a manner known in the art.

The diffuser 62 and the reaction canister 16 also cooperate to define an airbag cushion storage volume 76 for storage of the airbag cushion 20. In accordance with the illustrated embodiment of the invention and as will be described in greater detail below, the airbag cushion storage volume 76 includes an airbag cushion storage compartment 80 offset from the diffuser gas flow through area 70 and an airbag cushion storage space 82 directly adjacent the diffuser gas flow through area 70.

In order to best maximize the usage of the space within the airbag module assembly 14, the airbag cushion 20 shown in FIGS. 7 and 8 has been pleated with two side pleats 84a and 84b, respectively, so as to have width corresponding to the length L of the reaction canister 16 which forms the cushion housing assembly. It will be appreciated that the need for pleats and the number of such pleats will generally be dependent on the relative sizes of the airbag cushion and the reaction housing. Thus, assemblies wherein the airbag cushion has 0, 1, 2 or more pleats are within the scope of the invention.

The airbag cushion 20 includes a point, denominated "Point A," on the external surface 24 of the cushion, which generally corresponds to the Point J on the internal surface 26 of the cushion whereat the first end 44 of the tether 42 is attached, as shown in FIG. 6.

Figure 9:
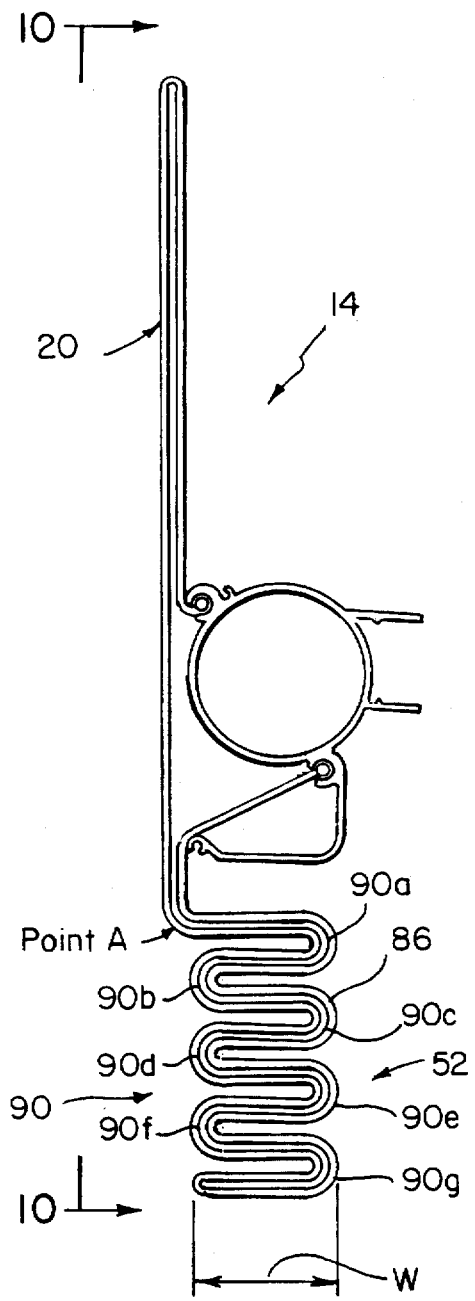
FIG. 9 is a simplified, sectional side view of the airbag module assembly of FIG. 7, with the lower portion of the airbag cushion partially folded.
Figure 10:
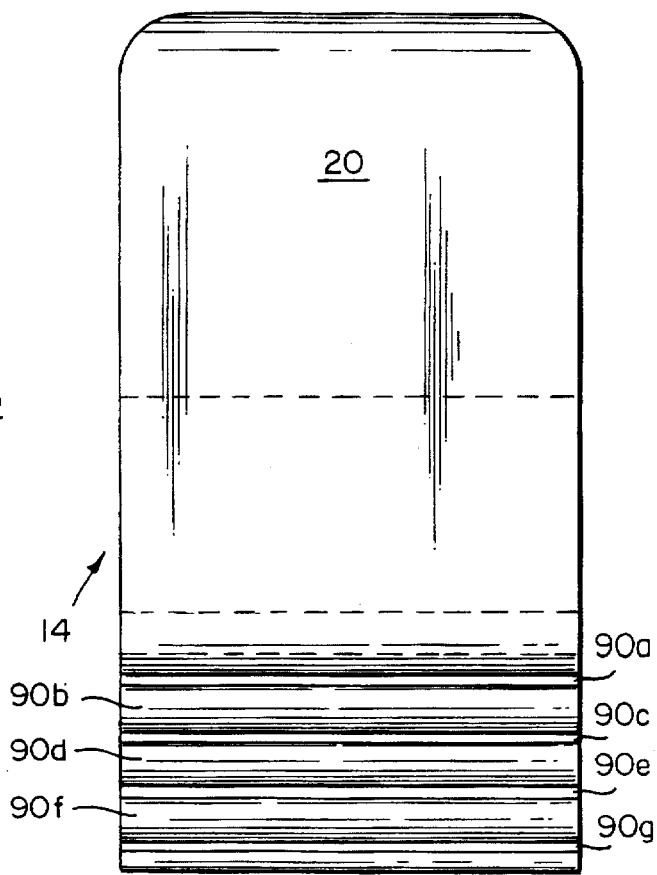
FIG. 10 is a front view, taken substantially along the line 10—10, of the airbag module assembly of FIG. 9.

FIGS. 9 and 10 illustrate the module assembly 14 with the airbag cushion 20 in a partially folded condition. It is to be appreciated that in order to simplify illustration and comprehension, FIGS. 9–18 do not show the module assembly inflator 66.

As shown in FIGS. 9 and 10, a portion 86 of the airbag cushion 20, generally corresponding to airbag cushion lower portion 52, is folded by means of a set of accordion folds 90 of a generally uniform width, designated "W." In the illustrated embodiment, seven accordion folds 90(a–g) have been shown. It will be appreciated that the invention in its broader terms is not limited by the specific number of such folds. Thus, assemblies wherein the airbag cushion has alternatively, either a greater or a fewer number of such folds, are also contemplated.

Figure 12:
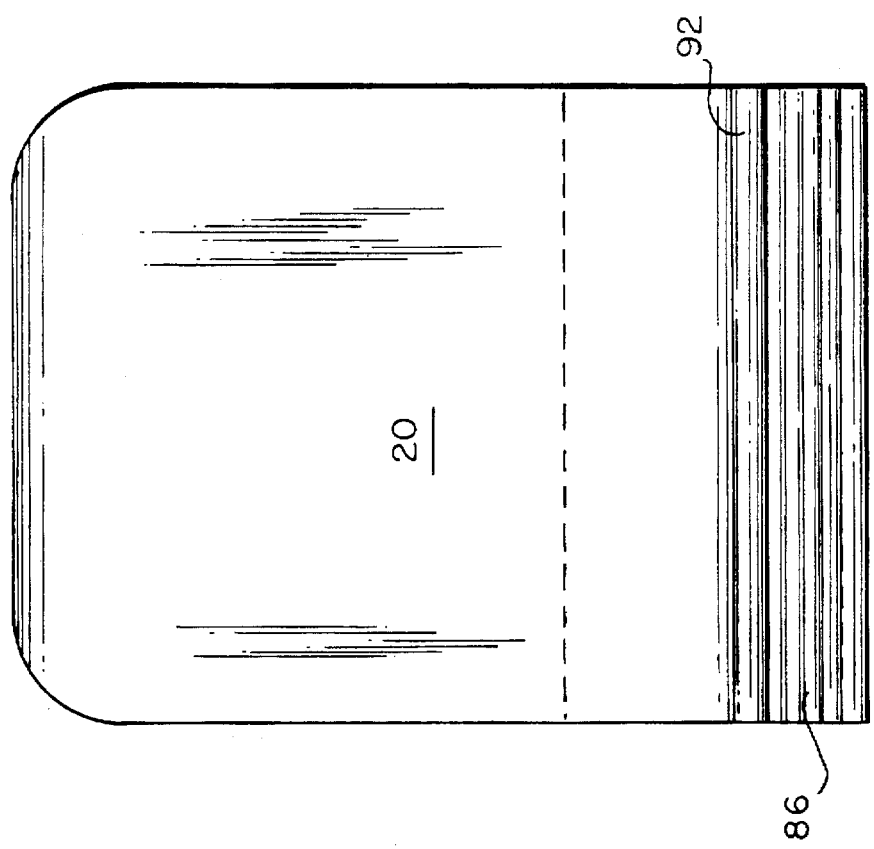
FIG. 12 is a front view, taken substantially along the line 12—12, of the airbag module assembly of FIG. 11.
Figure 11:
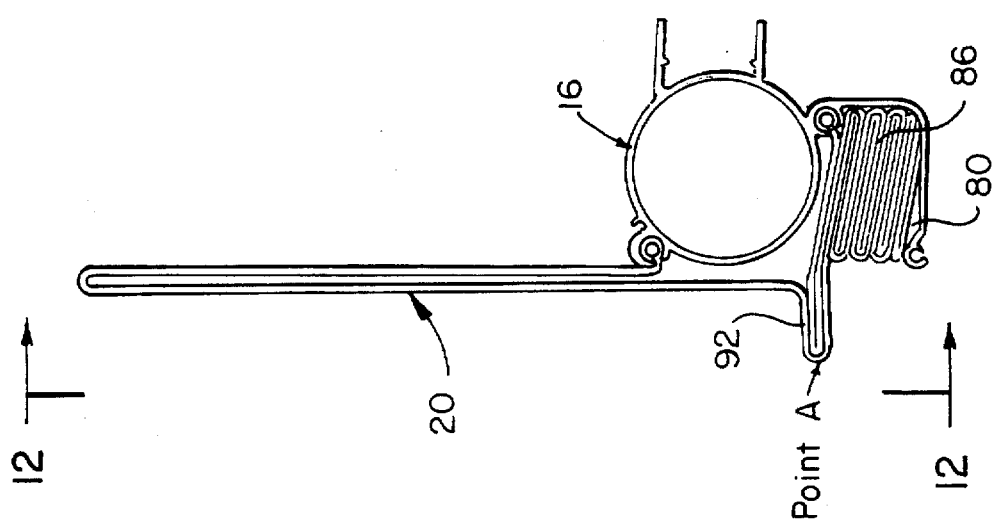
FIG. 11 is a simplified, sectional side view of the airbag module assembly of FIG. 9, after the partially folded lower portion of the airbag cushion has been placed within the reaction canister housing of the assembly.

Subsequently, as shown in FIGS. 11 and 12, the accordion folded airbag cushion portion 86 is formed in a compact shape within the airbag cushion storage compartment 80 of the reaction canister 16. As shown, at this juncture of the assembly process, a flap portion 92 of the airbag cushion 20, including the Point A, preferably is not included with the accordion folded airbag cushion portion 86 within the airbag cushion storage compartment 80.

Figure 14:
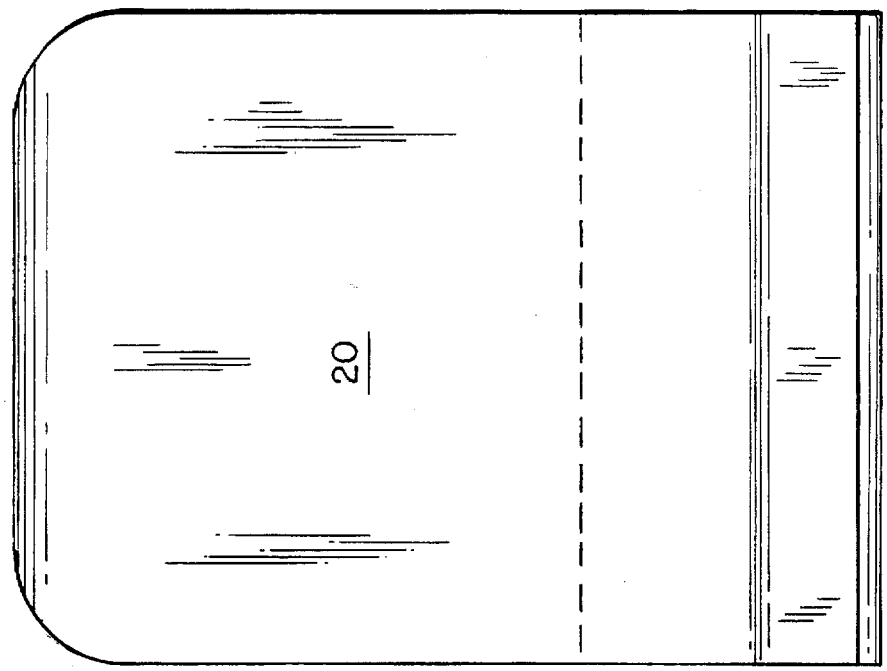
FIG. 14 is a front view, taken substantially along the line 14—14, of the airbag module assembly of FIG. 11.
Figure 13:
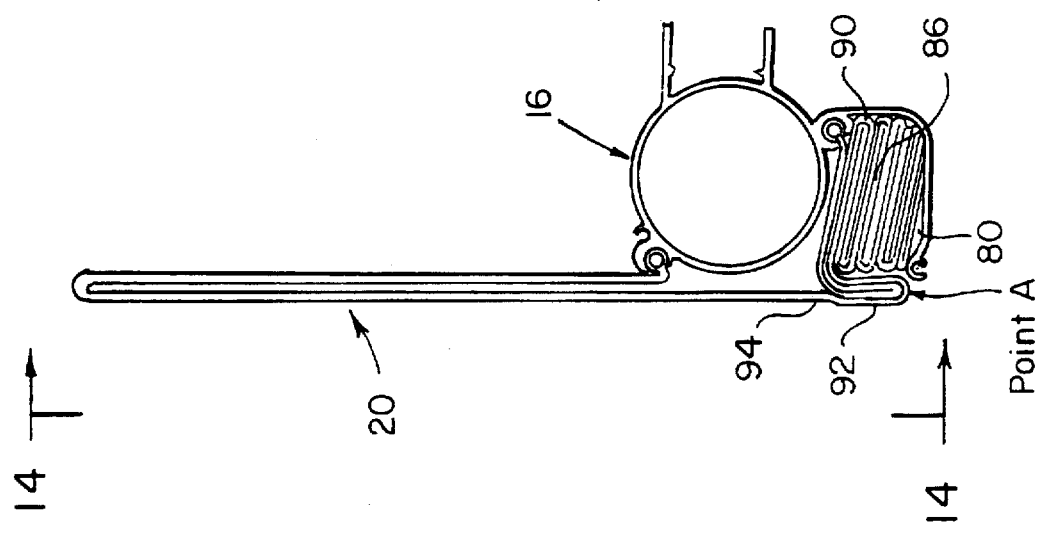
FIG. 13 is a simplified, sectional side view of the airbag module assembly of FIG. 11, with the airbag cushion further partially folded.

Next, as shown in FIGS. 13 and 14, the flap portion 92 of the airbag cushion 20 is folded over, generally perpendicularly adjacent, the accordion folded airbag cushion portion 86 within the airbag cushion storage compartment 80 of the reaction canister 16. Thus, the airbag cushion is folded to include a fold 94 generally running perpendicular to the accordion folds 90a–f.

Figure 15:
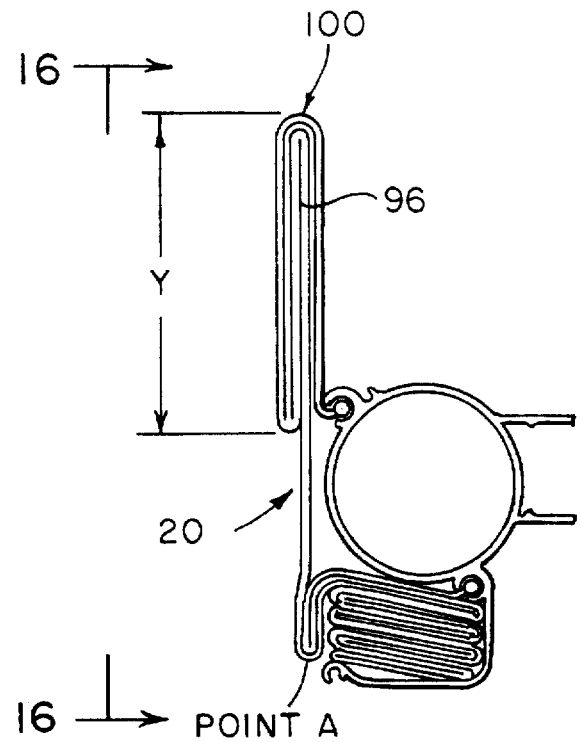
FIG. 15 is a simplified, sectional side view of the airbag module assembly of FIG. 13, with the upper portion of the airbag cushion partially folded.
Figure 16:
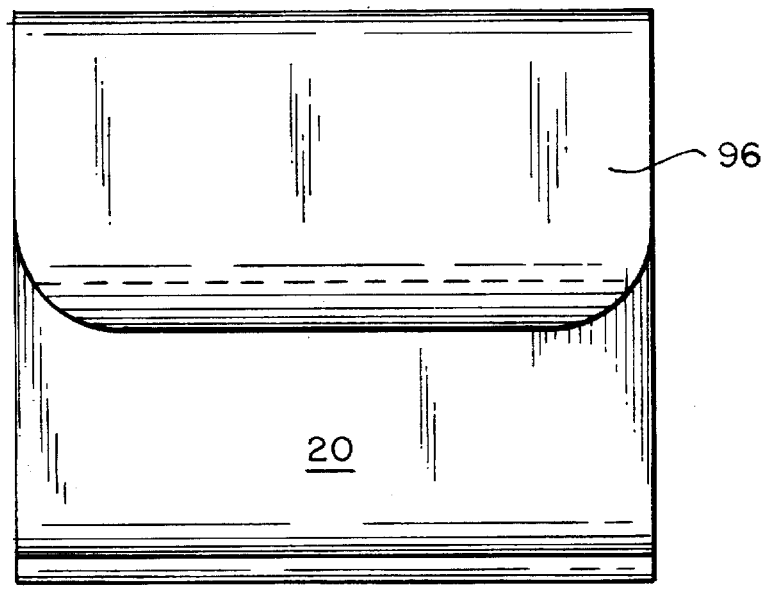
FIG. 16 is a front view, taken substantially along the line 16—16, of the airbag module assembly of FIG. 15.

Then, as shown in FIGS. 15 and 16, a portion 96 of the airbag cushion 20, generally corresponding to the airbag cushion upper portion 50 (shown in FIG. 6), is folded by means of a series of roll folds 100 of generally uniform length Y.

Figure 17:
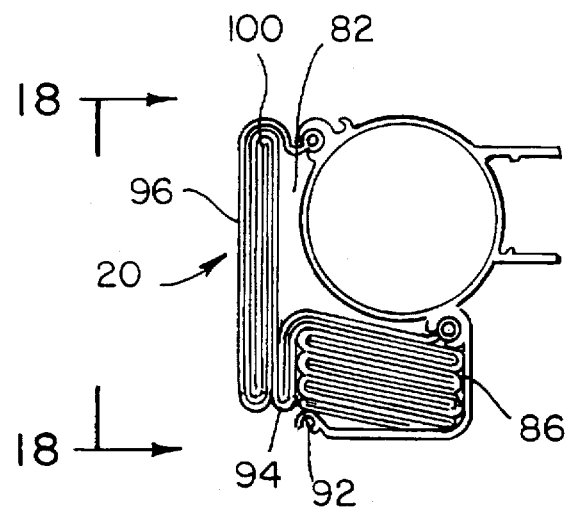
FIG. 17 is a simplified, sectional side view of the airbag module assembly of FIG. 15, with the upper portion of the airbag cushion in a further folded state.
Figure 18:
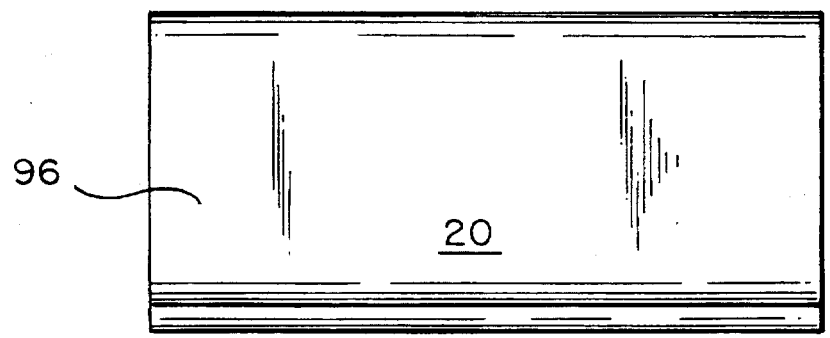
FIG. 18 is a front view, taken substantially along the line 18—18, of the airbag module assembly of FIG. 17.

Thereafter, as shown in FIGS. 17 and 18, the portion 96 of the airbag cushion 20 is folded over, generally adjacent, the previously folded over airbag cushion portion 86. As shown, the roll folds 100 of the airbag cushion portion 96 are generally parallel to the fold 94 of the airbag cushion flap portion 92. The airbag cushion portion 96 is placed within the airbag cushion storage space 82 over the diffuser gas flow through area 70 (shown in FIGS. 7 and 8).

In order to better appreciate various of the advantages resulting from the above-described airbag module assembly, the deployment process of the airbag cushion 20 from the airbag module assembly 14 will be described making reference to FIGS. 1–4:

In the event of a sudden vehicle deceleration such as occurs in the event of a collision, an inflator assembly (not shown) within the vehicle 10 is actuated, such as in a known manner, to direct an inflation media, such as a gas, into the airbag cushion 20. The airbag cushion 20 thereby rapidly inflates in a rearward direction toward the vehicle occupant 22, i.e., toward the left as viewed in FIGS. 1–4, to provide a cushioning restraint to prevent or reduce injury to the occupant in the event of such a vehicular crash or accident.

More specifically, with regards to the inflation of the airbag cushion 20, the airbag cushion portion 96 begins to inflate and is pushed out of the reaction canister 16. As shown in FIG. 1, at the same time that the airbag cushion 20 begins to inflate and deploy from the assembly 14, the airbag cushion portion 86 remains substantially in place within the airbag cushion storage compartment 80.

Figure 2:
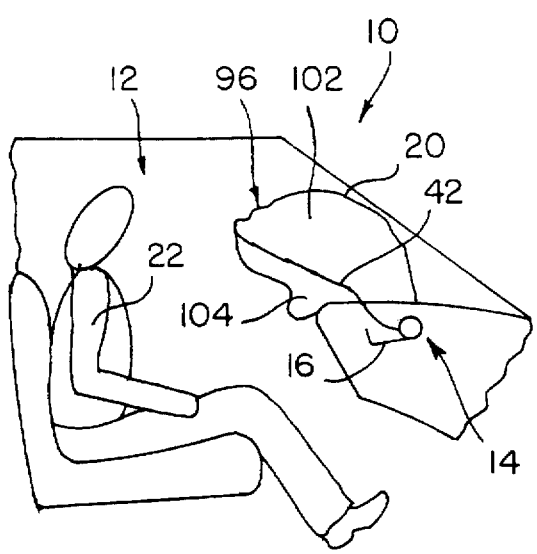

As shown in FIG. 2, movement of the airbag cushion portion 96 towards the occupant 22 is stopped when the tether 42 has been fully extended. As a result, the potential for bag slap is avoided.

Figure 3:
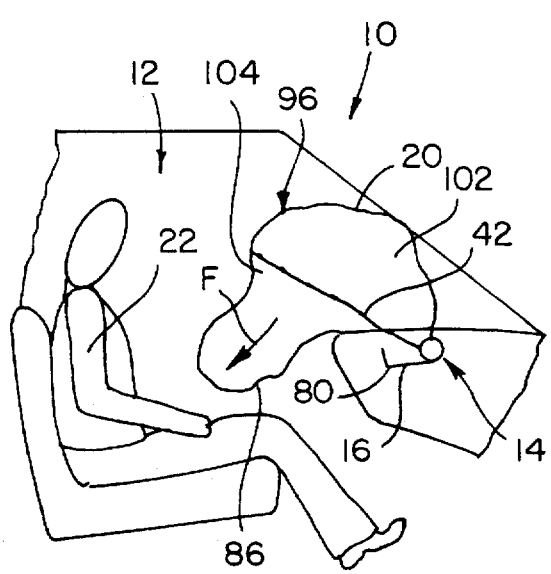

With the movement of the airbag cushion portion 96 towards the occupant 22 now halted, as shown in FIG. 3, the mass of inflation media into the airbag cushion 20 is signified by the arrow F and is directed into the airbag cushion portion 86, which portion has now begun to deploy out of the airbag cushion storage compartment 80. As a result of such direction of the inflation media, the airbag cushion portion 86 begins to inflate at a relatively rapid rate, with a direction of deployment away from the head and generally towards the chest and pelvis regions of the occupant.

At this point, the tether 42 also can begin to serve as a separation member within the inflating airbag cushion 20, thereby serving to define an upper airbag cushion chamber 102 and a lower airbag cushion chamber 104. The upper airbag cushion chamber 102 is generally formed by the airbag cushion portion 96, which is the part of the airbag cushion 20 which is generally first inflated. The lower airbag cushion chamber 104, in turn, is generally formed by the airbag cushion portion 86.

It is to be appreciated that once the tether 42 becomes fully extended, as shown in FIG. 2, the upper airbag cushion chamber 102 will be substantially fully inflated and the pressure within the chamber 102 will increase as the inflation media passing into the airbag cushion 20 will have to pass around the tether 42 in order to flow into the lower airbag cushion chamber 104.

Then, as shown in FIG. 4, the lower airbag cushion portion 104 is more fully inflated and directed to provide protection to the lower portion of the body of the occupant 22.

It is to be appreciated that the above-described airbag cushion deployment process results in the very rapid proper positioning of the airbag cushion.

Also, the above-described airbag cushion deployment process permits the utilization of relatively long airbag cushion shapes, as may be desired in order to provide more complete protection to a vehicle occupant, while minimizing or avoiding the risk and potential for undesired bag slap of the vehicle occupant.

As illustrated in FIGS. 1–4, the airbag cushion 20 is disposed in the vehicle 10 in a top mount configuration. It will be understood that other mounting configuration can be used and the present invention, in its broader terms, is not limited to a top mount configuration. It also to be appreciated that for airbag module assemblies, in accordance with the invention and mounted in other configurations, the relative lengths or spans of the upper and lower portions of the airbag cushion can differ from those illustrated and described above in order to meet various specific vehicular inflatable restraint system airbag cushioning needs.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An inflatable restraint airbag module for the protection of an occupant of a vehicle, said module comprising:
   an inflatable airbag cushion with external and internal surfaces and having an inflation gas inlet opening and a rearwardly facing cushioning surface for engaging the occupant when said airbag cushion is inflated, said airbag cushion including a tether having opposed first and second ends, with the first end of the tether attached to the internal surface of the rearwardly facing cushioning surface and the second end of the tether attached to an airbag cushion tether base, the tether dividing said airbag cushion into an upper portion and a lower portion,
   an airbag inflator which emits inflation gas upon actuation,
   an open-mouthed reaction canister forming a housing for said airbag cushion and said inflator, and
   an inflation gas diffuser including a face member interposed between said inflator and the gas inlet opening of said airbag cushion, the face member including a gas flow through area comprising at least one inflation gas passage aperture for conveying inflation gas from said inflator to said airbag cushion, said diffuser and said reaction canister cooperating to define an inflator storage volume for storage of said inflator and an airbag cushion storage volume for storage of said airbag cushion, the airbag cushion storage volume including an airbag cushion storage compartment offset from gas flow through area of said diffuser and an airbag cushion storage space adjacent the gas flow through area of said diffuser,
   wherein:
      the lower portion of said airbag cushion is formed in a compact shape and placed within the airbag cushion storage compartment, and
      the upper portion of said airbag cushion is formed in a compact shape and placed within the airbag cushion storage space,
      wherein, upon inflation of said airbag cushion, inflation of the upper portion of said airbag cushion precedes inflation of the lower portion of said airbag cushion.

2. The inflatable restraint airbag module of claim 1 wherein the lower portion of said airbag cushion is accordion folded.

3. The inflatable restraint airbag module of claim 2 wherein the upper portion of said airbag cushion is roll folded.

4. The inflatable restraint airbag module of claim 1 wherein the upper portion of said airbag cushion is roll folded.

5. The inflatable restraint airbag module of claim 1 wherein the tether divides the rearwardly facing cushioning surface into an upper third portion adapted for engaging the occupant's head and a lower two-thirds portion adapted for engaging the occupant below the head.

6. The inflatable restraint airbag module of claim 1 wherein said reaction canister comprises a reaction canister body formed by conventional extrusion.

7. The inflatable restraint airbag module of claim 6 wherein the reaction canister body and said inflation gas diffuser are formed in a one piece construction.

8. A passenger side inflatable restraint airbag module comprising the inflatable restraint airbag module of claim 1.

9. The inflatable restraint airbag module of claim 1 wherein said reaction canister comprises a reaction canister body and said airbag cushion is pleated to have a width corresponding to the length of the reaction canister body.

10. A passenger side inflatable restraint airbag module for the protection of an occupant of a vehicle, said module comprising:
   a stored inflatable airbag cushion having external and internal surfaces and formed of a sheet material, said airbag cushion having, at a forward end, a throat section defining an inflation gas inlet opening and a main panel forming a rearwardly facing cushioning surface for engaging the occupant when said airbag cushion is inflated, said airbag cushion further comprising a tether having opposed first and second ends, the first end of the tether attached to the internal surface of the rearwardly facing cushioning surface and the second end of the tether anchored to said airbag module, the tether dividing the main panel into an upper third portion adapted for engaging the occupant's head and a lower two-thirds portion adapted for engaging the occupant below the head, an airbag inflator which emits inflation gas upon actuation, an open-mouthed reaction canister forming a housing for said airbag cushion and said inflator, and an inflation gas diffuser including a face member interposed between said inflator and the gas inlet opening of said airbag cushion, the face member including a gas flow through area comprising at least one inflation gas passage aperture for conveying inflation gas from said inflator to said airbag cushion, said diffuser and said reaction canister cooperating to define an inflator storage volume for storage of said inflator and an airbag cushion storage volume for storage of said airbag cushion, the airbag cushion storage volume including an airbag cushion storage compartment offset from gas flow through area of said diffuser and an airbag cushion storage space directly adjacent the gas flow through area of said diffuser, wherein:
- the lower two-thirds portion of the main panel of said airbag cushion is accordion folded in a compact shape and placed within the airbag cushion storage compartment, and
- the upper third portion of the main panel of said airbag cushion is folded in a compact shape and placed within the airbag cushion storage space over the gas flow through area of said diffuser,
- wherein inflation of said airbag cushion includes the following sequential steps:
  a) inflation and deployment of the upper third portion of said airbag cushion through the mouth of said reaction canister;
  b) the tether becoming fully extended to limit rearward extension of the rearwardly facing cushioning surface of said airbag cushion when said airbag cushion is inflated; and
  c) passage of additional inflation gas into the lower two-thirds portion of the main panel of said airbag cushion to provide protection to the lower portion of the body of the occupant.

11. The inflatable restraint airbag module of claim 10 wherein said reaction canister comprises a reaction canister body and said airbag cushion is pleated to have a width corresponding to the length of the reaction canister body.

12. An inflatable folded airbag cushion for restraining a vehicle occupant, said airbag cushion having an initially unfolded and uninflated condition and made of an airbag material, said airbag cushion further having a forward end and a rearwardly facing cushioning surface for engaging the occupant when said airbag cushion is inflated, said airbag cushion defining a gas inlet opening at a central position at the forward end, the gas inlet opening is attached to a cushion housing assembly having an open side and a diffuser having a gas flow through area comprising at least one inflation gas passage aperture for conveying inflation gas to inflate said airbag cushion, said airbag cushion having an upper portion above the gas inlet opening and a lower portion below the gas inlet opening, said airbag cushion being pleated to have a width corresponding to the length of said cushion housing assembly, with the lower portion of said airbag cushion being in a folded compact shape within said cushion housing in an airbag cushion storage compartment offset from the gas flow through area of said diffuser and the upper portion of said airbag cushion being in a folded compact shape within said cushion housing in an airbag cushion storage space directly adjacent the gas flow through area of said diffuser;

wherein, upon inflation of said airbag cushion, inflation of the upper portion of said airbag cushion precedes inflation of the lower portion of said airbag cushion.

13. The inflatable folded airbag cushion of claim 12 wherein the lower portion is accordion folded.

14. The inflatable folded airbag cushion of claim 13 wherein the upper portion is roll folded.

15. The inflatable folded airbag cushion of claim 12 wherein the upper portion is roll folded.

16. The inflatable folded airbag cushion of claim 12 additionally comprising an internal tether, wherein upon inflation of said airbag cushion the tether becomes fully extended to limit rearward extension of the rearwardly facing cushioning surface of said airbag cushion when said airbag cushion is inflated.

\* \* \* \* \*